(12) United States Patent
Margines et al.

(10) Patent No.: US 11,699,274 B2
(45) Date of Patent: Jul. 11, 2023

(54) LONG RANGE LOCALIZATION WITH SURFEL MAPS

(71) Applicant: Waymo LLC, Mountain View, CA (US)

(72) Inventors: David Yonchar Margines, Sunnyvale, CA (US); Carlos Hernandez Esteban, Kirkland, WA (US); Michael Montemerlo, Mountain View, CA (US); Peter Pawlowski, Menlo Park, CA (US); Colin Andrew Braley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 480 days.

(21) Appl. No.: 17/064,339

(22) Filed: Oct. 6, 2020

(65) Prior Publication Data

US 2022/0108119 A1    Apr. 7, 2022

(51) Int. Cl.
  *G06V 20/58*    (2022.01)
  *G06V 10/25*    (2022.01)
  *G06T 7/90*    (2017.01)
  *B60W 60/00*    (2020.01)
  *G06V 10/75*    (2022.01)

(52) U.S. Cl.
  CPC ........... *G06V 10/25* (2022.01); *B60W 60/001* (2020.02); *G06T 7/90* (2017.01); *G06V 10/751* (2022.01); *G06V 20/58* (2022.01); *B60W 2420/42* (2013.01); *B60W 2420/52* (2013.01);
(Continued)

(58) Field of Classification Search
  CPC ...... G06V 10/25; G06V 20/58; G06V 10/751; G06T 7/90
  See application file for complete search history.

(56) References Cited

U.S. PATENT DOCUMENTS

2021/0149408 A1*   5/2021   Dodson ................ G05D 1/0221

FOREIGN PATENT DOCUMENTS

WO   WO 2017/220966   12/2017

OTHER PUBLICATIONS

Behley et al., "Efficient Surfel-Based SLAM using 3D Laser Ranee Data in Urban Environments," Robotics: Science and Systems, Jun. 2018. 10 pages.
(Continued)

*Primary Examiner* — Sam Bhattacharya
(74) *Attorney, Agent, or Firm* — Fish & Richardson P.C.

(57) ABSTRACT

Methods, systems, and apparatus, including computer programs encoded on computer storage media, for using a surfel map to generate long range localization. One of the methods includes obtaining, for a particular location of a vehicle having a camera and a detection sensor, surfel data including a plurality of surfels. Each surfel in the surfel data has a respective location and corresponds to a different respective detected surface in an environment. Image data captured by the camera is obtained. It is determined that a region of interest for detecting objects for a vehicle planning process is outside a detectable region for the detection sensor. In response, it is determined that the image data for the region of interest matches surfel color data for the surfels corresponding to the region of interest. In response, the vehicle planning process is performed with the region of interest designated as having no unexpected objects.

20 Claims, 5 Drawing Sheets

(52) U.S. Cl.
CPC ............. *B60W 2554/802* (2020.02); *G06T 2207/30261* (2013.01)

(56) References Cited

OTHER PUBLICATIONS

Kläß et al., "Efficient mobile robot navigation using 3D surfel grid maps," Robotik 2012, 7th German Conference on Robotics, May 21, 2012, pp. 1-4.
Niewola et al.. "Point-to-Surfel-Distance—(PSD—) Based 6D Localization Algorithm for Rough Terrain Exploration Using Laser Scanner in GPS-Denied Scenarios," 12th International Workshop on Robot Motion and Control (RoMoCo), Jul. 8, 2019, pp. 112-117.
Pfister et al., "Surfels: Surface Elements as Rendering Primitives," Proceedings of the 27th Annual Conference on Computer Graphics and Interactive Techniques, Mar. 2000, pp. 335-342.
Park et al., "Probabilistic Surfel Fusion for Dense LiDAR Mapping," Proceedings of the IEEE International Conference on Computer Vision. 2017. pp. 2418-2426.
Schops et al., "SurfelMeshing: Online Surfel-Based Mesh Reconstruction," CoRR, Oct. 2018, arxiv.org/abs/1810.00729v1, 13 pages.
Stuckler et al., "Efficient Mobile Robot Navigation using 3D Surfel Grid Maps." In Proc. of the German Conference on Robotics. May 2012, 5 pages.
Stuckler et al., "Multi-Resolution Surfel Maps for Efficient Dense 3D Modeling and Tracking," Journal of Visual Communication and Image Representation. Jan. 2014, 25(1):137-147.
Wang et al., "Real-time Scalable Dense Surfel Mapping," 2019 International Conference on Robotics and Automation, May 2019, pp. 6919-6925.

\* cited by examiner

LONG RANGE LOCALIZATION WITH SURFEL MAPS

BACKGROUND

This specification relates to automatic planning of autonomous vehicle driving decisions.

Autonomous vehicles include self-driving cars, boats, and aircraft. Autonomous vehicles use a variety of on-board sensors in tandem with map representations of the environment in order to make control and navigation decisions.

Some autonomous vehicles use a two-dimensional or a 2.5-dimensional map to represent characteristics of the operating environment. A two-dimensional map associates each location, e.g., as given by latitude and longitude, with some properties, e.g., whether the location is a road, or a building, or an obstacle. A 2.5-dimensional map additionally associates a single elevation with each location. However, such 2.5-dimensional maps are problematic for representing three-dimensional features of an operating environment that might in reality have multiple elevations. For example, overpasses, tunnels, trees, and lamp posts all have multiple meaningful elevations within a single latitude/longitude location on a map.

Some autonomous vehicles use detection sensors, e.g., lidar systems that detect reflections of laser light, radar systems that detect reflections of radio waves, etc., to localize objects that are near the vehicles. However, such detection sensors can only generate reliable results for objects in a limited detectable region of the environment near the vehicle. For example, a lidar sensor system cannot detect an object in a region of interest that is too far away, e.g., 1000 meters from the vehicle, and the lidar sensor system cannot detect an object in a region of interest that is outside a field of view of the lidar sensor system, e.g., a car at the top of a steep road that is outside the field of view of the lidar sensors of the autonomous vehicle.

SUMMARY

This specification describes how a vehicle, e.g., an autonomous or semi-autonomous vehicle, can use a surfel map and image data captured by a camera to make long range localization predictions. A system on-board the vehicle can obtain the surfel data, e.g., surfel data that has been generated by one or more vehicles navigating through the environment at respective previous time points, from a server system and the sensor data from one or more sensors on-board the vehicle. The system can determine that a region of interest for detecting objects is outside a detectable region for one or more detection sensors. The image data captured by a camera can capture data for regions that are outside the detectable regions for the one or more detection sensors. The system can compare the surfel data corresponding to the region of interest and image data for the region of interest captured by a camera to determine whether the region of interest has unexpected objects. The system can make autonomous driving decisions based on whether the region of interest has unexpected objects.

Particular embodiments of the subject matter described in this specification can be implemented so as to realize one or more of the following advantages.

Using techniques described in this specification, an on-board system can combine an existing surfel map and online image data captured by a camera to generate a prediction about whether a state of a region of interest has changed, even though the region of interest is outside the detectable region for one or more detection sensors. With this predicted information of the environment, a planning system of the autonomous vehicle can plan for unexpected objects that are either far away from the vehicle or outside a field of view of the one or more detection sensors. The existing surfel data allows the system to get a jump-start on the prediction and plan ahead for regions that are not yet in the range of all of the detection sensors of the vehicle, while the image data captured by a camera can be compared with the existing surfel data to determine the changing conditions in the environment in a long range.

The techniques described in this specification can also reduce computational complexity and improve speed in two ways. Using surfels to check a wider-field of view allows the on-board system to implement a lidar system covering a smaller field of view. And focusing on a smaller lidar field-of-view reduces the computational complexity required and therefore makes the detection process faster. In addition, using surfels with camera images allows for more efficient processing over a wider field of view.

Rather than relying entirely on existing representations of the world that are generated offline using sensor data generated at previous time points, using techniques described in this specification, the on-board system can generate a prediction for a state of a region of interest in a long range in a more reliable way, because the state of the environment might have changed since the representation was generated offline or since the environment was last observed. Unlike other existing systems that rely entirely on sensor data, e.g., image data captured by a camera, generated by the vehicle at the current time point, using techniques described in this specification, the on-board system can generate a prediction for a state of a region of interest in a long range more efficiently, because the system can leverage existing knowledge about the environment that the vehicle or other vehicles have gathered at previous time points. For example, based on an existing surfel map, the system can identify a region of a road at a much greater distance, e.g., 1000 meters, than would be possible if using currently available lidar sensors. In addition, the system can compare surfel color data corresponding to the region with only a relatively small portion of the image for the region of interest, without a need to perform complex analysis over the entire image.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
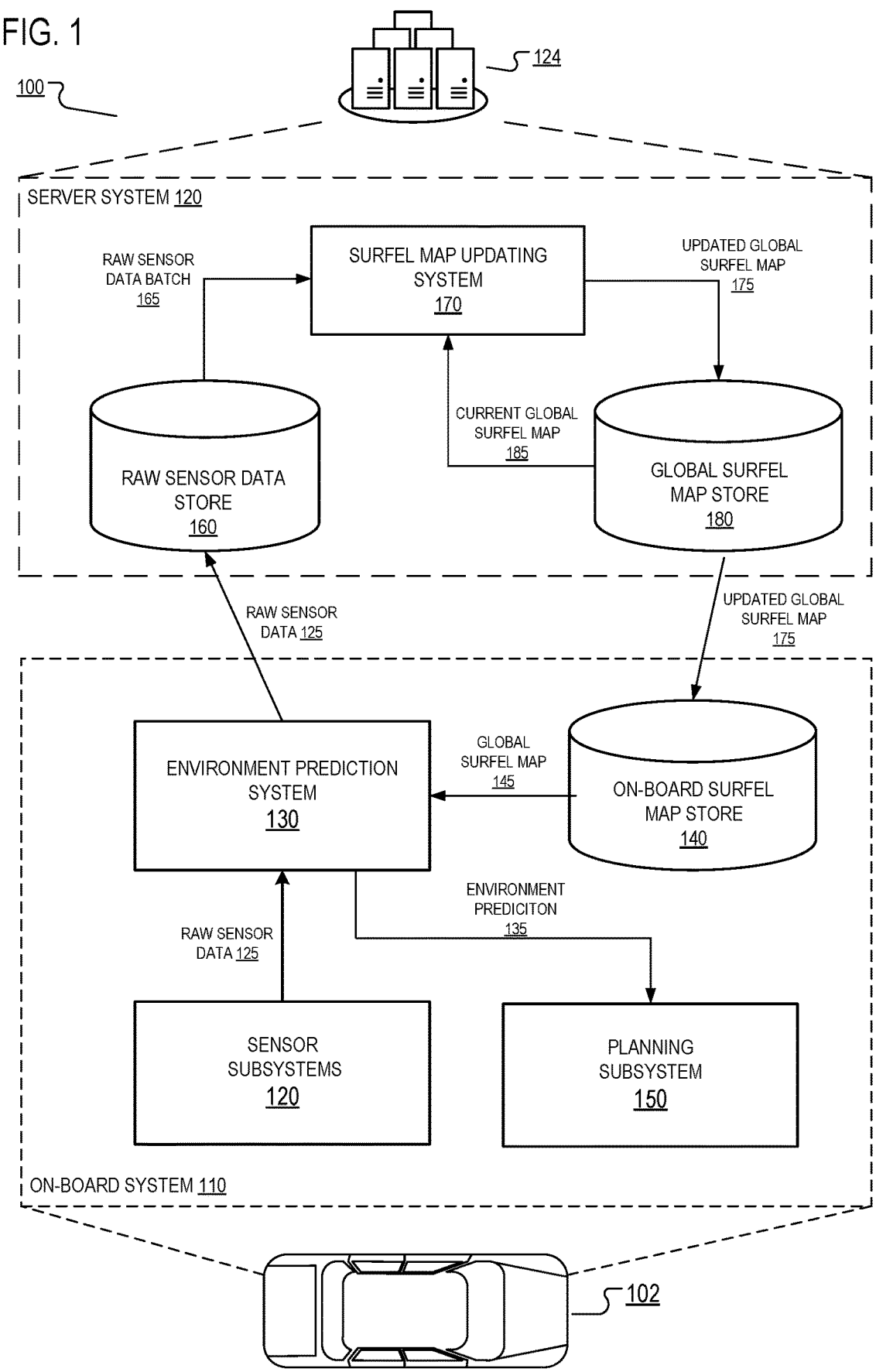
FIG. 1 is a diagram of an example system.

This specification describes how a vehicle, e.g., an autonomous or semi-autonomous vehicle, can use a surfel map to make long range localization predictions.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x, y, z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g., a vector with a magnitude of 1, which defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples. In some implementations, different surfels in a surfel map can have different sizes, so that a surfel map can have varying levels of granularity depending on the environment described by the surfel map; e.g., large surfels can corresponds to large, flat areas of the environment, while smaller surfels can represent areas of the environment that require higher detail.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g., one or more labels describing the surface or object characterized by the surfel. As a particular example, if a surfel map represents a portion of a city block, then each surfel in the surfel map can have a semantic label identifying the object that is being partially characterized by the surfel, e.g., "streetlight," "stop sign," "mailbox," etc.

A surfel map can characterize a real-world environment, e.g., a particular portion of a city block in the real world, or a simulated environment, e.g., a virtual intersection that is used to simulate autonomous driving decisions to train one or more machine learning models. As a particular example, a surfel map characterizing a real-world environment can be generated using sensor data that has been captured by sensors operating in the real-world environment, e.g., sensors on-board a vehicle navigating through the environment. In some implementations, an environment can be partitioned into multiple three-dimensional volumes, e.g., a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 120 which every vehicle in the system 100 can access.

The vehicle 102 in FIG. 1 is illustrated as an automobile, but the on-board system 110 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g., an object or another vehicle represented in a surfel map. The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light. The sensor subsystems 120 include one or more detection sensors, e.g., one or more lidar sensors or laser sensors in lidar systems, one or more radar sensors in radar systems, etc.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 120 classify one or more groups of raw sensor measurements as being measures of a respective object of a particular type, the sensor subsystems 120 can compile the raw sensor measurements into a set of raw sensor data 125, and send the raw data 125 to an environment prediction system 130.

The on-board system 110 also includes an on-board surfel map store 140 that stores a global surfel map 145 of the real-world. The global surfel map 145 is an existing surfel map that has been generated by combining sensor data captured by multiple vehicles navigating through the real world.

Generally, every vehicle in the system 100 uses the same global surfel map 145. In some cases, different vehicles in the system 100 can use different global surfel maps 145, e.g., when some vehicles have not yet obtained an updated version of the global surfel map 145 from the server system 120.

Each surfel in the global surfel map 145 can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel, e.g., "pole" with probability 0.8, "street sign" with probability 0.15, and "fire hydrant" with probability 0.05.

The environment prediction system 130 can receive the global surfel map 145 and combine it with the raw sensor data 125 to generate an environment prediction 135. The environment prediction 135 includes data that characterizes a prediction for the current state of the environment, including predictions for an object or surface at one or more locations in the environment that is outside a detectable region for one of the one or more detection sensors, e.g., one or more lidar sensors.

The raw sensor data 125 can include data from one or more detection sensors, and image data captured by one or more cameras. The environment prediction system 130 can determine that a region of interest for detecting objects for a vehicle planning process is outside a detectable region for the detection sensors, e.g., a road surface that is at a far distance (e.g., 1000 meters) from the lidar sensors, or a location that is outside the field of view of the lidar sensors. The environment prediction system 130 can generate environment prediction 135 based on image data captured by the cameras and the global surfel map 145.

For example, the environment prediction system can determine whether the image data for a region of interest matches surfel color data for one or more surfels corresponding to the region of interest. Based on whether the image data matches the surfel color data, the environment prediction system can determine whether the region of interest has unexpected objects, e.g., an unexpected car on the region of the road.

In this specification, when image data is considered to "match" surfel color data for a particular region can be defined by any appropriate color matching process. In the simplest case, the system can determine whether one or more pixel values for the particular region are within a threshold distance of one or more pixel values associated with a surfel in order to determine a match. However, the environment prediction system can also use more sophisticated matching processes to make the detections robust to possibly highly variable environmental changes. For example, on a rainy day, the color of a road may be darker than it is on a sunny day. To account for these changes, the environment prediction system 130 can compare the difference between two distances: 1) a first distance between image data and corresponding surfel color data within the lidar field of view, and 2) a second distance between image data and corresponding surfel color data outside of a lidar field of view. That way, a rainy road surface won't be registered as an unexpectedly gray object outside the lidar field of view. The same techniques can be used to perform matches at night, which can rely on characteristics of low-light camera imagery, e.g., infrared images.

The environment prediction system 130 can provide the environment prediction 135 to a planning subsystem 150, which can use the environment prediction 135 to make autonomous driving decisions, e.g., generating a planned trajectory for the vehicle 102 through the environment. Because the environment prediction system 130 can provide the environment prediction 135 for a region of interest even when the region of interest is outside a detectable region for the detection sensors, e.g., one or more lidar sensors, the planning subsystem 150 can make better autonomous driving decisions.

For example, the environment prediction 135 can include predictions for one or more unexpected objects, e.g., cars or other obstacles, which are at a greater distance, e.g., 1000 meters, from the vehicle 102. The planning subsystem 150 of the autonomous vehicle 102 that is driving on a freeway at 65 mph can have enough time to generate a planned trajectory, e.g., to make a lane change in order to avoid the unexpected objects.

The environment prediction system 130 can also provide the raw sensor data 125 to a raw sensor data store 160 located in the server system 120.

The server system 120 is typically hosted within a data center 124, which can be a distributed computing system having hundreds or thousands of computers in one or more locations.

The server system 120 includes a raw sensor data store 160 that stores raw sensor data generated by respective vehicles navigating through the real world. As each vehicle captures new sensor data characterizing locations in the real world, each vehicle can provide the sensor data to the server system 120. The server system 120 can then use the sensor data to update the global surfel map that every vehicle in the system 100 uses. That is, when a particular vehicle discovers that the real world has changed in some way, e.g., construction has started at a particular intersection or a street sign has been taken down, the vehicle can provide sensor data to the server system 120 so that the rest of the vehicles in the system 100 can be informed of the change.

The server system 120 also includes a global surfel map store 180 that maintains the current version of the global surfel map 185.

A surfel map updating system 170, also hosted in the server system 120, can obtain the current global surfel map 185 and a batch of raw sensor data 165 from the raw sensor data store 160 in order to generate an updated global surfel map 175. In some implementations, the surfel map updating system 170 updates the global surfel map at regular time intervals, e.g., once per hour or once per day, obtaining a batch of all of the raw sensor data 165 that has been added to the raw sensor data store 160 since the last update. In some other implementations, the surfel map updating system 170 updates the global surfel map whenever a new raw sensor data 125 is received by the raw sensor data store 160.

In some implementations, the surfel map updating system 170 generates the updated global surfel map 175 in a probabilistic way.

In some such implementations, for each measurement in the batch of raw sensor data 165, the surfel map updating system 170 can determine a surfel in the current global surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current global surfel map 185 as a prior distribution. The surfel map updating system 170 can then update the prior using the measurement to generate posterior distribution for the corresponding location. This posterior distribution is then included in the associated data of the corresponding surfel in the updated global surfel map 175.

If there is not currently a surfel at the location of a new measurement, then the surfel map updating system 170 can generate a new surfel according to the measurement.

In some such implementations, the surfel map updating system 170 can also update each surfel in the current global surfel map 185 that did not have a corresponding new measurement in the batch of raw sensor data 165 to reflect a lower certainty that an object is at the location corresponding to the surfel. In some cases, e.g., if the batch of raw sensor data 165 indicates a high confidence that there is not an object at the corresponding location, the surfel map updating system 170 can remove the surfel from the updated global surfel map 175 altogether. In some other cases, e.g., when the current global surfel map 185 has a high confidence that the object characterized by the surfel is permanent and therefore that the lack of a measurement of the object in the batch of raw sensor data 165 might be an error, the surfel map updating system 170 might keep the surfel in the updated global surfel map 175 but decrease the confidence of the updated global surfel map 175 that an object is at the corresponding location.

After generating the updated global surfel map 175, the surfel map updating system 170 can store it in the global surfel map store 180, replacing the stale global surfel map 185. Each vehicle in the system 100 can then obtain the updated global surfel map 175 from the server system 120, e.g., through a wired or wireless connection, replacing the stale version with the retrieved updated global surfel map 175 in the on-board surfel map store 140. In some implementations, each vehicle in the system 100 retrieves an updated global surfel map 175 whenever the global surfel map is updated and the vehicle is connected to the server system 120 through a wired or wireless connection. In some other implementations, each vehicle in the system 100 retrieves the most recently updated global surfel map 175 at regular time intervals, e.g., once per day or once per hour.

Figure 2A:
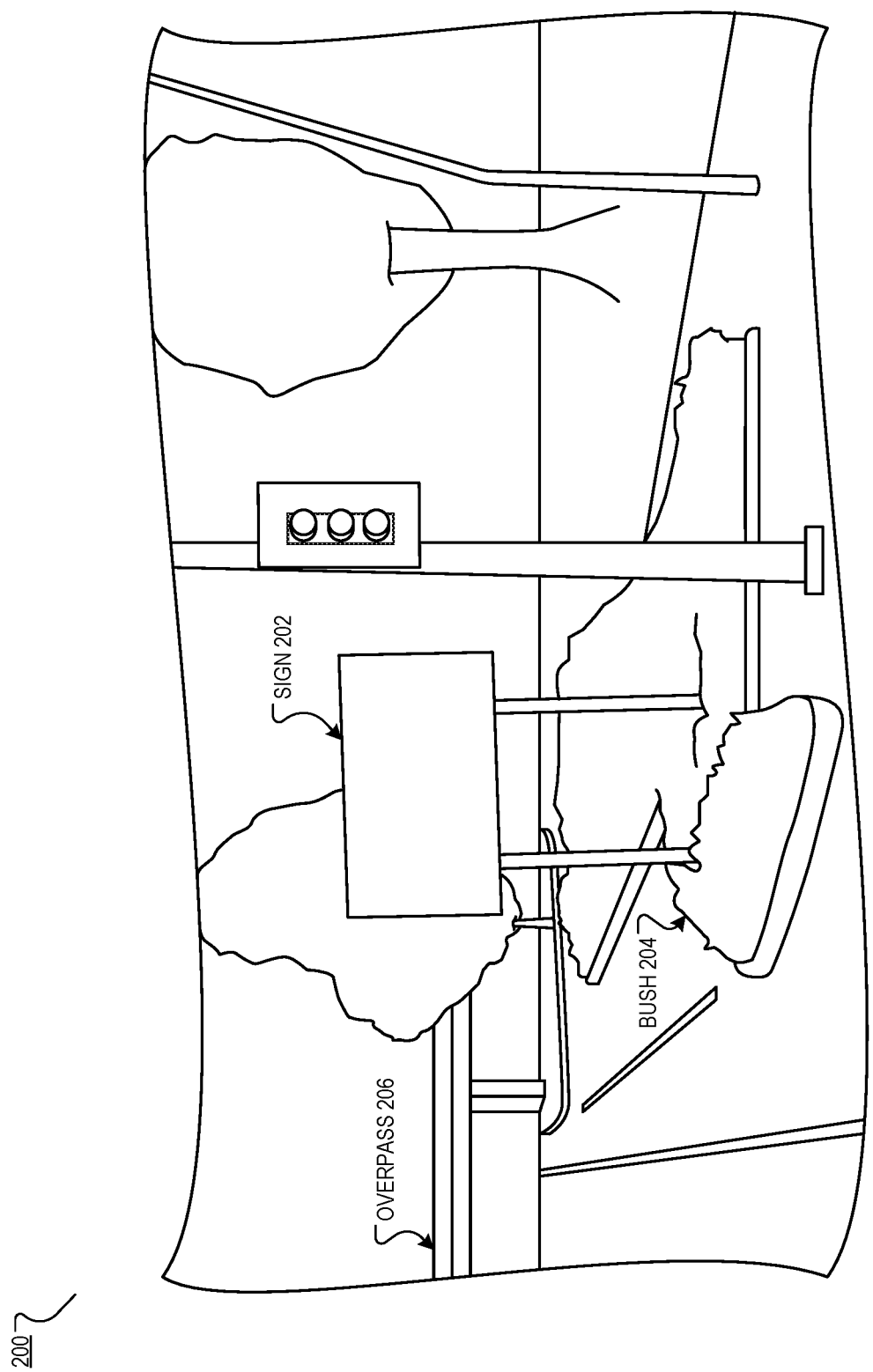
FIG. 2A is an illustration of an example environment.

FIG. 2A is an illustration of an example environment 200. The environment 200 is depicted from the point of view of a sensor on-board a vehicle navigating through the environment 200. The environment 200 includes a sign 202, a bush 204, and an overpass 206.

Figure 2B:
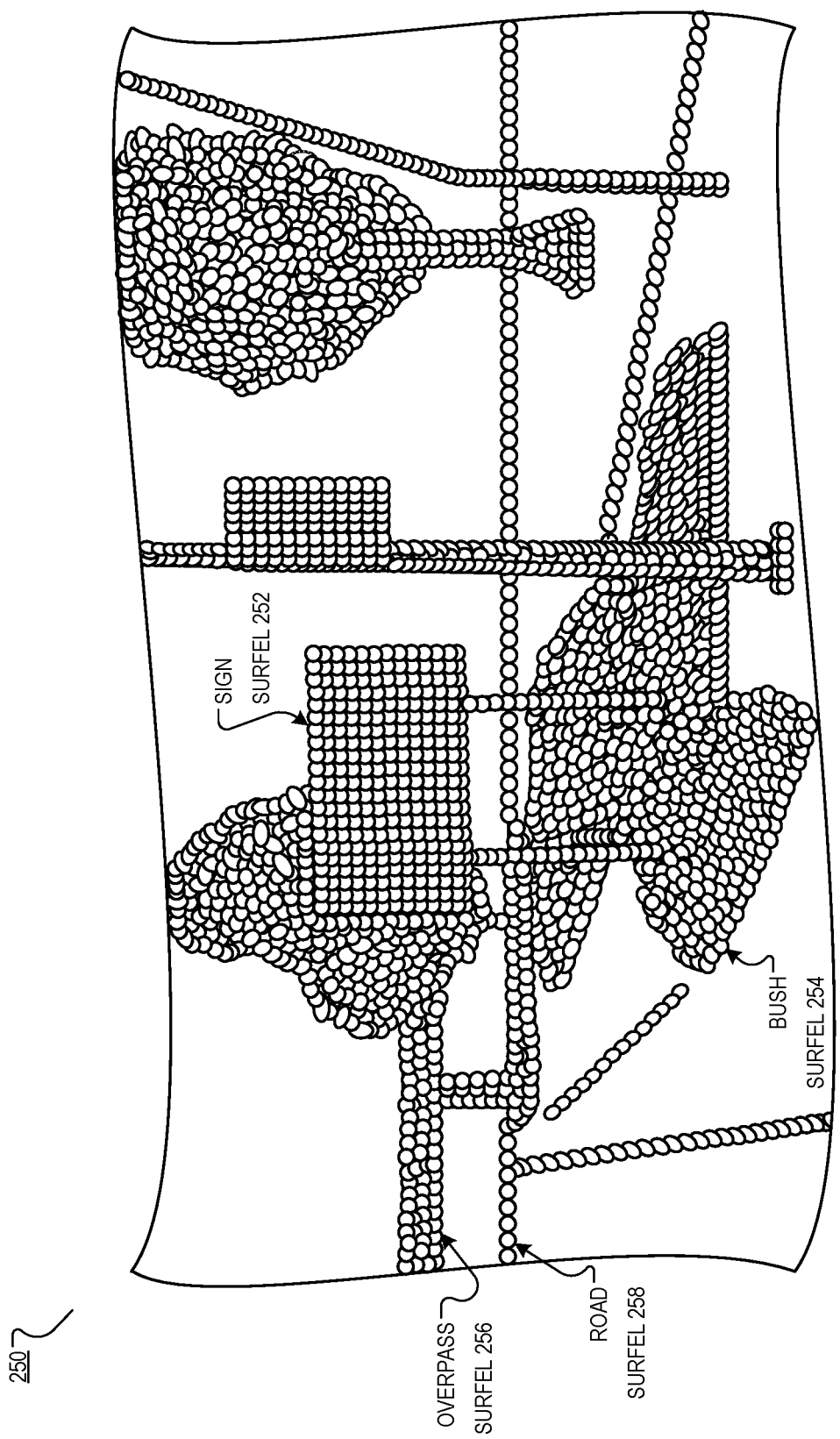
FIG. 2B is an illustration of an example surfel map of the environment of FIG. 2A.

FIG. 2B is an illustration of an example surfel map 250 of the environment 200 of FIG. 2A.

Each surfel in the surfel map 250 is represented by a disk, and defined by three coordinates (latitude, longitude, altitude), that identify a position of the surfel in a common coordinate system of the environment 200 and by a normal vector that identifies an orientation of the surfel. For example, each voxel can be defined to be the disk that extends some radius, e.g., 1, 10, 25, or 100 centimeters, around the (latitude, longitude, altitude) coordinate. In some other implementations, the surfels can be represented as other two-dimensional shapes, e.g. ellipsoids or squares.

The environment 200 is partitioned into a grid of equal-sized voxels. Each voxel in the grid of the environment 200 can contain at most one surfel, where, e.g., the (latitude, longitude, altitude) coordinate of each surfel defines the voxel that the surfel occupies. That is, if there is a surface of an object at the location in the environment corresponding to a voxel, then there can be a surfel characterizing the surface in the voxel; if there is not a surface of an object at the location, then the voxel is empty. In some other implementations, a single surfel map can contain surfels of various different sizes that are not organized within a fixed spatial grid.

Each surfel in the surfel map 250 has associated data characterizing semantic information for the surfel. For example, as discussed above, for each of multiple classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "permanent" label might have a high probability for surfels characterizing vegetation. Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicted that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

As another example, the surfel map 250 includes a bush surfel 254 that characterizes a portion of the bush 204 depicted in FIG. 2A. The bush surfel 254 might have labels predicted that the type of the object characterized by the bush surfel 254 is "bush" with probability 0.75 and "tree" with probability 0.25. Because bushes can grow, be trimmed, and die with relative frequency, the "permanent" label for the bush surfel 254 might be 0.2. The bush surfel 254 might have color labels predicting the color of the bush 204 to be "green" with probability 0.7 and "yellow" with probability 0.3. Because the bush 204 is not completely opaque and does not reflect a lot of light, an opacity label of the bush surfel 254 might predict that the sign is "opaque" with probability 0.7 and a reflectivity label of the sign surfel 252 might predict that the sign is "reflective" with probability 0.4.

The surfel map 250 can include an overpass surfel 256 that can represent an overpass 206 in the environment. The overpass 206 can be outside a detectable region for a detection sensor, e.g., a lidar sensor, because the overpass 206 has a high altitude, and therefore is outside the field of view of the lidar sensor. Even though the overpass 206 is outside the detectable region for the detection sensor, the system can still make predictions for a state of the overpass 206 based on the overpass surfel 256 and an image captured by a camera. For example, the system can determine whether color data of the pixels corresponding to the overpass in the image matches color data of the overpass surfel 256. If the two matches, the system can determine there are no unexpected changes to the overpass 206. If the two do not match, the system can determine the status of the overpass 206 has changed, e.g., the overpass has been removed or reconstructed. The planning subsystem of the autonomous vehicle can use the predicted status of the overpass to generate navigation plans, e.g., to avoid the region of the overpass if the region is predicted to be under construction.

Figure 3:
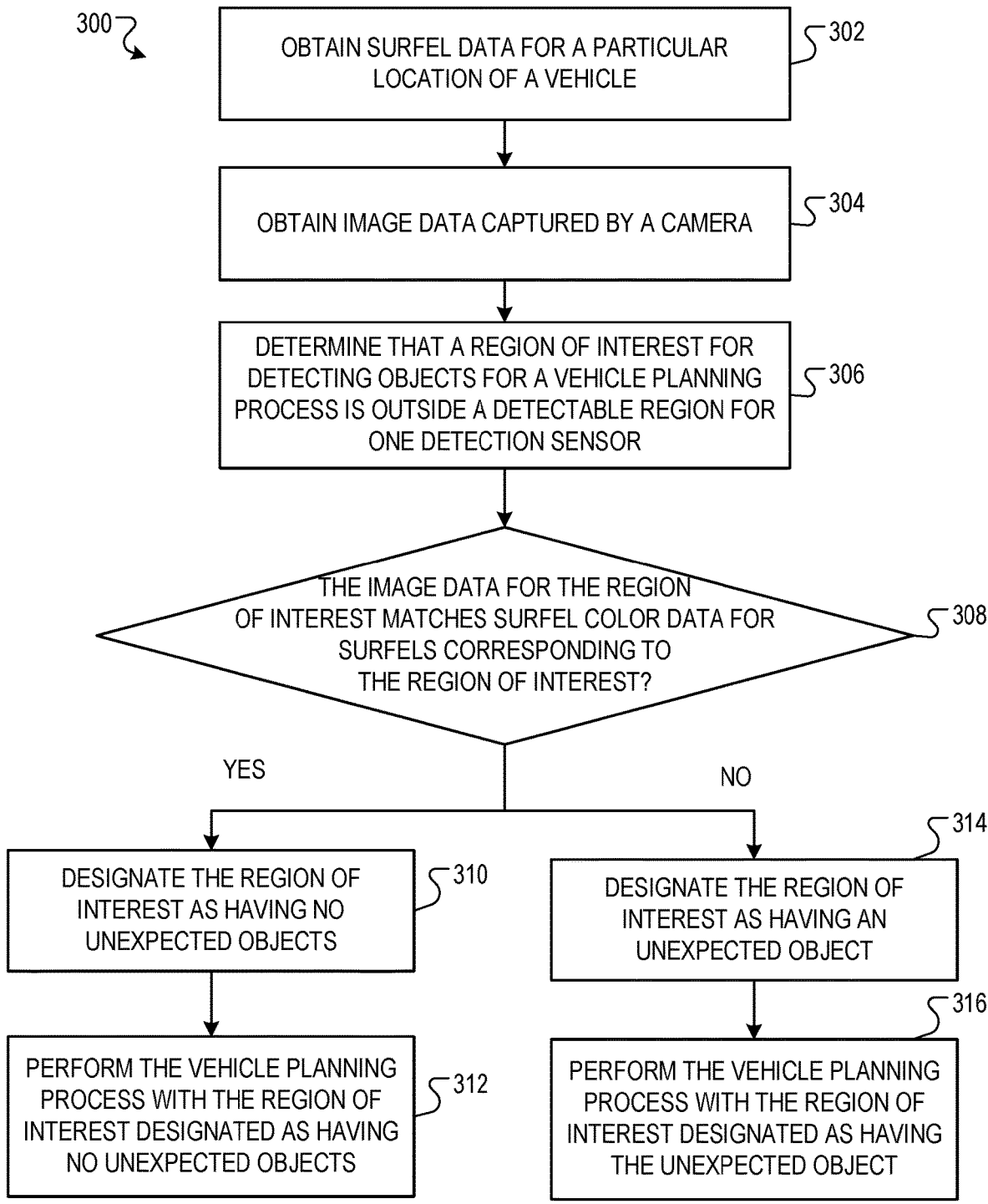
FIG. 3 is a flow diagram of an example process for long range localization with surfel maps.

FIG. 3 is a flow diagram of an example process 300 for generating long range localization predictions with surfel data and sensor data. For convenience, the process 300 will be described as being performed by a system of one or more computers located in one or more locations. For example, an environment prediction system, e.g., the onboard environment prediction system 130 depicted in FIG. 1, appropriately programmed in accordance with this specification, can perform the process 300.

The system obtains surfel data of an environment observed from a particular location of a vehicle (step 302). The vehicle can have multiple cameras and multiple detection sensors, e.g., lidar sensors, radar sensors, etc. The surfel data can be a portion of the surfel map stored in the on-board surfel map store 140. The surfel data can depict the environment observed from a current location of a vehicle. For example, the surfel data can depict the crossing of two roads observed from a vehicle currently stopped at the crossing of the two roads.

The surfel data includes multiple surfels that each has a respective location and each corresponds to a different respective detected surface in an environment. The surfel data depicts an environment with static objects, e.g., buildings, roads, trees, bridges, etc. The surfel data does not include non-static objects, e.g., vehicles, pedestrians, cyclists, etc.

Each surfel in the surfel data can also have a surfel color label, indicating a color of the corresponding surface, e.g., color "gray" for a surfel that corresponds to a surface of a road, color "red" for a surfel that corresponds to a surface region of a STOP sign. In some implementations, the surfel data is represented using a voxel grid, where each surfel in the surfel data corresponds to a different voxel in the voxel grid.

The system obtains image data captured by a camera (step 304). The image data can include live images captured by one or more camera sensors of the vehicle navigating in the environment. The image data can include camera sensor measurements that can be represented as an image patch, e.g., an RGB image patch. For example, the image data can include image patches of the environment, such as a road, a pedestrian, a cyclist, etc.

The system determines that a region of interest for detecting objects for a vehicle planning process is outside a detectable region for the detection sensors (step 306). The system may need to predict objects in a region of interest in order to plan actions or routes in the vehicle planning process. For example, the system of a vehicle stopped at a crossing road may need to detect objects at a certain distance, e.g., 500 meters away from the vehicle, such that the system of the vehicle can have enough time to plan and navigate the vehicle, e.g., a plan of whether moving forward or waiting.

The system can use the detection sensors to detect objects that are within the detectable region of the detection sensors. In some implementations, the one or more detection sensors can be lidar sensors. The detectable region of the detection sensors can be within a certain range. For example, the detectable region of the lidar sensors can be several hundred meters, e.g., 200 meters, from the lidar sensors.

The system can determine that a region of interest is outside a detectable region for the detection sensors. In some implementations, the region of interest is outside the detectable region for the one or more detection sensors because the region of interest is too far away to be detected by the one or more detection sensors. For example, the system is interested in detecting cars that are 500 meters away from the vehicle. This distance is outside the detectable region of the lidar sensors, i.e., 200 meters from the lidar sensors. The system can determine that it cannot reliably detect cars that are 500 meters away using the sensor data from the lidar sensors.

In some implementations, the region of interest is outside the detectable region for the one or more detection sensors because the region of interest is outside a field of view of the one or more detection sensors. The field of view of a detection sensor is an angular extent of the field which can be observed by the detection sensor. For example, a field of view of a lidar sensor can be 360 degrees in the horizontal direction and 60 degrees in the vertical direction. A region that is outside the vertical field of view of a lidar sensor may not get detected by the lidar sensor. As a particular example, the system is interested in detecting whether cars are coming from the top of a steep road on the left of the crossing. Because the region of interest is relatively high in the vertical direction, the region of interest, e.g., the top part of the steep road, is outside the vertical field of view of a lidar sensor. The system can determine that it cannot reliably detect cars from the top of the steep road using the sensor data from the lidar sensors.

The system determines whether the image data for the region of interest matches surfel color data for one or more surfels corresponding to the region of interest (step 308). In response to determining that the system cannot use detection sensors to detect objects in the region of interest, the system can use camera sensors to obtain image data of the region of interest, and the system can compare the image data with existing surfel data in the surfel maps. Because the surfel data depicts a static environment with static objects, e.g., roads, trees, bridges, etc., differences between the image data and the surfel data can indicate a change of the environment, e.g., unexpected non-static objects, such as, a car or a pedestrian, etc.

Camera sensors can capture images of objects that are outside the detectable region for the detection sensors, e.g., objects that are far away, or objects that are in a wide field of view. For example, image data captured by a camera can capture a vehicle on the road that is 500 meters away. As another example, image data captured by a camera can capture a vehicle on the top of a steep road.

The system determines whether the image data for the region of interest matches surfel color data for one or more surfels corresponding to the region of interest in order to determine whether unexpected objects are in the region of interest. In some implementations, each surfel is associated with the surfel color data representing a color of a surface to which the surfel corresponds, and determining whether the image data for the region of interest matches the surfel color data includes determining whether one or more pixels of the image data matches the surfel color data. For example, surfel color data for a region of interest that corresponds to a surface of a road can be "gray" color, and the image data for the region of interest can be "blue" color. This may indicate the region of interest has an unexpected object, e.g., an unexpected blue car. As another example, the image data for a surface of a road in the current lane at a far distance can be "orange" color, and this may indicate that there might be a cone in the road.

If the system determines that the image data for the region of interest matches surfel color data for one or more surfels corresponding to the region of interest, the system designates the region of interest as having no unexpected objects (step 310). The system can determine that the region of interest in the static environment depicted by the surfel map has not changed, and does not have unexpected non-static objects. For example, if the image data for a portion of the road is "gray" color, which is the same as the surfel color data for the portion of the road, the system can determine that the portion of the road is empty, e.g., does not have cars, pedestrians, etc.

In response to determining that the image data for the region of interest matches surfel color data for one or more surfels corresponding to the region of interest, the system performs the vehicle planning process with the region of interest designated as having no unexpected objects (step 312). By designating the road as having unexpected non-static moving objects, the system can take this information into consideration when performing the vehicle planning process. For example, the system can provide the status of the regions of interest, e.g., having no unexpected objects, to a planning subsystem of the system, e.g., the planning subsystem 150 depicted in FIG. 1, and the planning subsystem can generate the planned path.

In some implementations, performing the vehicle planning process with the region of interest designated as having no unexpected objects includes generating a plan to move the vehicle forward. For example, the system can make a plan for the vehicle to move forward because within 500 meters range, there are no oncoming vehicles.

If the system determines that the image data for the region of interest does not match surfel color data for one or more surfels corresponding to the region of interest, the system designates the region of interest as having an unexpected object (step 314). The system can determine that the region of interest in the static environment depicted by the surfel map has changed, and has unexpected non-static objects. For example, if the image data for a portion of the road is "blue" color, which does not match the surfel color data for the portion of the road, e.g., "gray" color, the system can determine that the portion of the road is currently occupied by an unexpected object with "blue" color, e.g., a blue car.

In response to determining that the image data for the region of interest does not match surfel color data for one or more surfels corresponding to the region of interest, the system performs the vehicle planning process with the region of interest designated as having the unexpected object (step 316). By designating the road as having unexpected non-static moving objects, the system can take this information into consideration when performing the vehicle planning process. For example, the system can provide the status of the regions of interest, e.g., having unexpected objects, to a planning subsystem of the system, e.g., the planning subsystem 150 depicted in FIG. 1, and the planning subsystem can generate the planned path. The system can generate the planned path in order to avoid the unexpected objects in the environment, e.g., an unexpected car on the road.

In some implementations, performing the vehicle planning process with the region of interest designated as having the unexpected object includes generating a plan to wait for the unexpected object to no longer be detected before moving the vehicle forward. For example, the vehicle may be on a first street and approaching a second street, and a planned path of the vehicle can instruct the vehicle to make a right turn onto the second street. Because the system determines that the second street has an unexpected object, e.g., a blue car, the system can make a plan for the vehicle to wait for the blue car on the second street to leave before allowing the vehicle to make the right turn onto the second street.

As another example, the system of a vehicle that is driving on the freeway at 65 mph may need to know unexpected objects that are further away, e.g., 1000 meters, such that the system can have enough time to make an autonomous driving plan for the vehicle. The detection sensors, e.g., lidar sensors, of the vehicle may only be able to detect objects that are 200 meters away from the vehicle, while the cameras of the vehicle can capture images of objects that are much further, e.g., more than 1000 meters away from the vehicle. Through comparison of the surfel data in existing surfel maps of the portion of the road in the long distance and the currently captured image data from one or more cameras, the system can determine that unexpected objects, e.g., cones, or vehicles blocking the road in the long distance, e.g., 1000 meters away. Based on the detected unexpected objects in the long distance, the system can plan a lane change action or a slowdown action for the vehicle.

Figure 4:
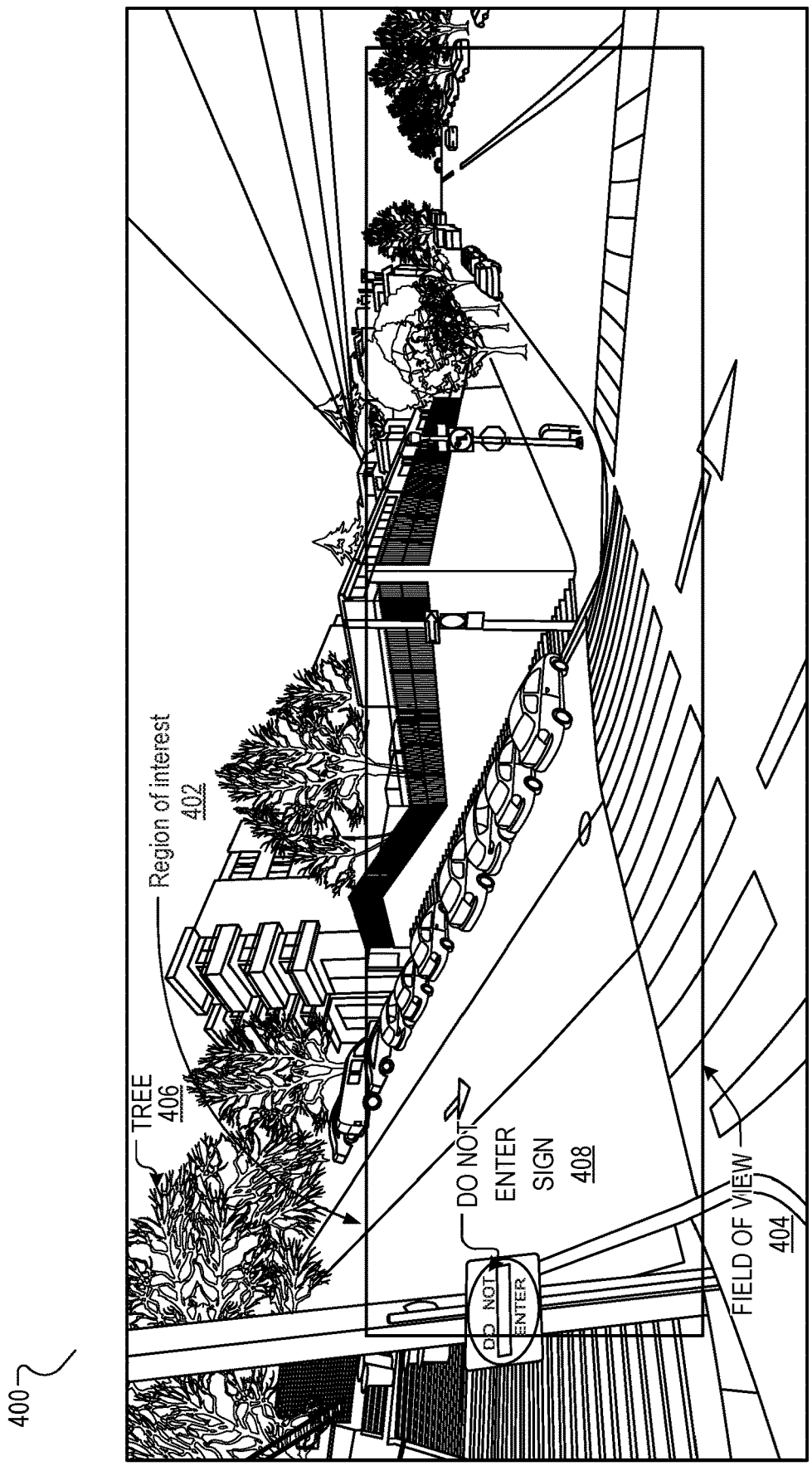
FIG. 4 is an illustration of an example environment for localization outside the angular field of view of a lidar sensor.

FIG. 4 is an illustration of an example environment 400 for localization outside the angular field of view of a lidar sensor. The environment 400 is depicted from the point of view of a camera on-board a vehicle navigating through the environment 400. The vehicle is at a crossing of a first road and a second road. The environment 400 includes the first road that the vehicle is currently on, and the second road that is at an intersection with the first road. The second road has a steep slope, i.e., the top of the second road is a lot higher than the bottom of the second road that intersects with the first road. The planned route for the vehicle is to make a right turn and continue to drive on the second road. The vehicle is currently waiting at the intersection for its chance to make a right turn.

The system can determine that a region of interest for detecting objects for a vehicle planning process is outside a detectable region for the detection sensors of the vehicle. The system is interested in detecting objects coming from the top of the steep second road, e.g., unexpected objects at a region of interest 402. The detectable region for the detection sensors of the vehicle can be limited. For example, the field of view 404 of lidar sensors of the vehicle is indicated by a rectangle, e.g., 180 degrees in the horizontal direction and 60 degrees in the vertical direction. The region of interest 402 is outside the detectable region for the lidar sensors because the region of interest 402 is outside the field of view 404 of the lidar sensors. Given the speed of a potential unexpected vehicle and speed limit of the second road, the system cannot detect far enough of the second road to be able to make plans for taking a right turn if the system relies entirely on the lidar sensors.

The system can obtain image data captured by a camera of the vehicle. The camera can have a wider field of view, horizontally and vertically, and can capture information of the environment that is further away, e.g., outside the lidar field of view. The system can determine whether the currently captured image data of the region of interest 402 matches previously captured surfel color data of the regions of interest 402. For example, as shown in FIG. 4, the pixels of the region of interest 402 are in gray color, and the gray color matches the surfel color data of the portion of the road. The system can determine that there is no car emerging from this region of interest 402. The system can generate a plan to allow the vehicle to make a right turn.

As another example, the pixels of the region of interest 402 can be in blue color if a blue car is driving on the second road passing by the region of interest 402. The system can determine that the blue color of the pixels of the region of interest 402 does not match the surfel color data (e.g., gray color) of the portion of the road. The system can determine that there is a blue object, e.g., a blue car, emerging from the region of interest 402. The system can generate a plan for the vehicle to wait for the blue car on the second street to leave before allowing the vehicle to make the right turn onto the second street.

In some implementations, different lighting conditions and/or weather conditions may change the color of the one or more pixels in the image data such that it no longer matches the corresponding surfel color data even when there are no unexpected objects in the region of interest. For example, when the road is wet, the color of the road for the region of interest 402 captured by the camera image can be "dark gray", and the corresponding surfel color data for the region of interest is "light gray".

Under these challenging conditions, the system can determine whether there are unexpected objects based on the surfel data inside and outside the lidar field of view 404. For an empty region inside the lidar field of view that does not have unexpected objects, the system can determine a baseline color transform between the image data and surfel data of the region. The system can determine the color transform between the image data and surfel data of a region of interest 404 that is outside the lidar field of view. The system can compare the color transform for the region outside the lidar field of view with the baseline color transform (i.e., the color transform inside the lidar field of view). If the color transform outside the lidar field of view is similar to the baseline color transform, the system can determine the region of interest 402 outside the lidar field of view does not have unexpected objects. If the color transform outside the lidar field of view is not similar to the baseline color transform, the system can determine the region of interest 402 has an unexpected object.

For example, the system can determine whether there are unexpected objects in a region of interest 402 that is outside the lidar field of view. When the road is wet, the surfel color data in the region of interest 402 outside the lidar field of view is "light gray" and the observed color of the pixels in that area is "dark gray". Through lidar sensors, the system can determine that an area of the road inside the lidar field of view 404 does not have unexpected objects. When the road is wet, the surfel color data in that area inside the lidar field of view 404 is "light gray" and the observed color of the pixels is "dark gray". Therefore, the baseline color transform is from "light gray" to "dark gray". The system can determine that the color transform for a to-be-determined region of interest 402 outside the lidar field of view is similar to the baseline color transform. The system can determine the region of interest 402 does not have unexpected objects.

As another example, the system can determine that the color transform for a to-be-determined region of interest 402 that is outside the lidar field of view, e.g., color transform from "light gray" to "dark red", is not similar to the baseline color transform. The system can determine that the region of interest 402 may have an unexpected object, e.g., an object with the color "dark red".

Sometimes, objects on the road may block a region of interest and the camera sensors would not be able to capture information of the region of interest. Surfel data in a surfel map can provide information of whether a region of interest is detectable by a camera. For example, the surfel map can include surfel data of a tree 406 which blocks the view of a portion of the second road that is further away from the region 402. The system can determine that the camera would not be able to capture unexpected objects in the portion of the second road that is further away from the region 402 because the portion of the second road has been occluded by the tree 406. The system can avoid performing object localization analysis in the portion of the second road. This can improve the system's efficiency and accuracy in long range localization tasks.

As another example, the surfel map can include surfel data of the "DO NOT ENTER" sign 408. By analyzing the surfel data of the "DO NOT ENTER" sign 408, the system can determine that the sign 408 does not block the view of a region of interest 402. The system can determine that the camera would be able to capture any unexpected object in the region of interest 402 because the region of interest 402 has not been occluded by any static objects in the environment, e.g., the "DO NOT ENTER" sign 408. The system can determine that color differences between the image data and surfel data can indicate a change of the environment, e.g., an unexpected car in the second road. The system can also determine that similar colors between the image data and surfel data can indicate that there are no unexpected objects in the second road and it is safe to move forward.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest matches surfel color data for one or more surfels corresponding to the region of interest;

in response, designating the region of interest as having no unexpected objects; and performing the vehicle planning process with the region of interest designated as having no unexpected objects.

Embodiment 2 is the method of embodiment 1, wherein the region of interest is outside the detectable region for the one or more detection sensors because the region of interest is too far away to be detected by the one or more detection sensors.

Embodiment 3 is the method of any one of embodiments 1 or 2, wherein the region of interest is outside the detectable region for the one or more detection sensors because the region of interest is outside a field of view of the one or more detection sensors.

Embodiment 4 is the method of any one of embodiments 1-3, wherein the one or more detection sensors comprise lidar sensors.

Embodiment 5 is the method of any one of embodiments 1-4, wherein each surfel is associated with the surfel color data representing a color of a surface to which the surfel corresponds, and wherein determining that the image data for the region of interest matches the surfel color data comprises determining that one or more pixels of the image data matches the surfel color data.

Embodiment 6 is the method of any one of embodiments 1-5, wherein performing the vehicle planning process with the region of interest designated as having no unexpected objects comprises generating a plan to move the vehicle forward.

Embodiment 7 is the method of any one of embodiments 1-6, wherein determining that the image data for the region of interest matches the surfel color data for the one or more surfels corresponding to the region of interest comprises:

determining that a distance between one or more pixel values of the image data for the region of interest and one or more pixel values associated with the surfel color data for the region of interest is within a threshold.

Embodiment 8 is the method of any one of embodiments 1-7, wherein determining that the image data for the region of interest matches the surfel color data for the one or more surfels corresponding to the region of interest comprises:

identifying a particular region that is within the detectable region for the one of the one or more detection sensors;

determining a first distance between one or more pixel values of image data for the particular region and one or more pixel values associated with surfel color data for the particular region;

determining a second distance between one or more pixel values of the image data for the region of interest and one or more pixel values associated with the surfel color data for the region of interest; and determining that a difference between the first distance and the second distance is within a threshold.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

Embodiment 11 is a method comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest does not match surfel color data for one or more surfels corresponding to the region of interest;

in response, designating the region of interest as having an unexpected object; and performing the vehicle planning process with the region of interest designated as having the unexpected object.

Embodiment 12 is the method of embodiment 11, wherein the region of interest is outside the detectable region for the one or more detection sensors because the region of interest is too far away to be detected by the one or more detection sensors.

Embodiment 13 is the method of any one of embodiments 11 or 12, wherein the region of interest is outside the detectable region for the one or more detection sensors because the region of interest is outside a field of view of the one or more detection sensors.

Embodiment 14 is the method of any one of embodiments 11-13, wherein the one or more detection sensors comprise lidar sensors.

Embodiment 15 is the method of any one of embodiments 11-14, wherein each surfel is associated with the surfel color data representing a color of a surface to which the surfel corresponds, and wherein determining that the image data for the region of interest does not match the surfel color data comprises determining that one or more pixels of the image data does not match the surfel color data.

Embodiment 16 is the method of any one of embodiments 11-15, wherein performing the vehicle planning process with the region of interest designated as having the unexpected object comprises generating a plan to wait for the unexpected object to no longer be detected before moving the vehicle forward.

Embodiment 17 is the method of any one of embodiments 11-16, wherein determining that the image data for the region of interest does not match the surfel color data for the one or more surfels corresponding to the region of interest comprises: determining that a distance between one or more pixel values of the image data for the region of interest and one or more pixel values associated with the surfel color data for the region of interest is larger than a threshold.

Embodiment 18 is the method of any one of embodiments 11-17, wherein determining that the image data for the region of interest does not match the surfel color data for the one or more surfels corresponding to the region of interest comprises:

identifying a particular region that is within the detectable region for the one of the one or more detection sensors;

determining a first distance between one or more pixel values of image data for the particular region and one or more pixel values associated with surfel color data for the particular region;

determining a second distance between one or more pixel values of the image data for the region of interest and one or more pixel values associated with the surfel color data for the region of interest; and determining that a difference between the first distance and the second distance is larger than a threshold.

Embodiment 19 is a system comprising: one or more computers and one or more storage devices storing instructions that are operable, when executed by the one or more computers, to cause the one or more computers to perform the method of any one of embodiments 11 to 18.

Embodiment 20 is a computer storage medium encoded with a computer program, the program comprising instructions that are operable, when executed by data processing apparatus, to cause the data processing apparatus to perform the method of any one of embodiments 11 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest matches surfel color data for one or more surfels corresponding to the region of interest;

in response, designating the region of interest as having no unexpected objects; and performing the vehicle planning process with the region of interest designated as having no unexpected objects.

2. The method of claim 1, wherein the region of interest is outside the detectable region for the one or more detection sensors because the region of interest is too far away to be detected by the one or more detection sensors.

3. The method of claim 1, wherein the region of interest is outside the detectable region for the one or more detection sensors because the region of interest is outside a field of view of the one or more detection sensors.

4. The method of claim 1, wherein the one or more detection sensors comprise lidar sensors.

5. The method of claim 1, wherein each surfel is associated with the surfel color data representing a color of a surface to which the surfel corresponds, and wherein determining that the image data for the region of interest matches the surfel color data comprises determining that one or more pixels of the image data matches the surfel color data.

6. The method of claim 1, wherein performing the vehicle planning process with the region of interest designated as having no unexpected objects comprises generating a plan to move the vehicle forward.

7. The method of claim 1, wherein determining that the image data for the region of interest matches the surfel color data for the one or more surfels corresponding to the region of interest comprises:

determining that a distance between one or more pixel values of the image data for the region of interest and one or more pixel values associated with the surfel color data for the region of interest is within a threshold.

8. The method of claim 1, wherein determining that the image data for the region of interest matches the surfel color data for the one or more surfels corresponding to the region of interest comprises:

identifying a particular region that is within the detectable region for the one of the one or more detection sensors;

determining a first distance between one or more pixel values of image data for the particular region and one or more pixel values associated with surfel color data for the particular region;

determining a second distance between one or more pixel values of the image data for the region of interest and one or more pixel values associated with the surfel color data for the region of interest; and determining that a difference between the first distance and the second distance is within a threshold.

9. A system comprising one or more computers and one or more storage devices storing instructions that are operable, when executed by the one or more computers, to cause the one or more computers to perform operations comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest matches surfel color data for one or more surfels corresponding to the region of interest;

in response, designating the region of interest as having no unexpected objects; and performing the vehicle planning process with the region of interest designated as having no unexpected objects.

10. One or more non-transitory computer storage media encoded with computer program instructions that when executed by a plurality of computers cause the plurality of computers to perform operations comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest matches surfel color data for one or more surfels corresponding to the region of interest;

in response, designating the region of interest as having no unexpected objects; and performing the vehicle planning process with the region of interest designated as having no unexpected objects.

11. A method performed by one or more computers, the method comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest does not match surfel color data for one or more surfels corresponding to the region of interest;

in response, designating the region of interest as having an unexpected object; and performing the vehicle planning process with the region of interest designated as having the unexpected object.

12. The method of claim 11, wherein the region of interest is outside the detectable region for the one or more detection sensors because the region of interest is too far away to be detected by the one or more detection sensors.

13. The method of claim 11, wherein the region of interest is outside the detectable region for the one or more detection sensors because the region of interest is outside a field of view of the one or more detection sensors.

14. The method of claim 11, wherein the one or more detection sensors comprise lidar sensors.

15. The method of claim 11, wherein each surfel is associated with the surfel color data representing a color of a surface to which the surfel corresponds, and wherein determining that the image data for the region of interest does not match the surfel color data comprises determining that one or more pixels of the image data does not match the surfel color data.

16. The method of claim 11, wherein performing the vehicle planning process with the region of interest designated as having the unexpected object comprises generating a plan to wait for the unexpected object to no longer be detected before moving the vehicle forward.

17. The method of claim 11, wherein determining that the image data for the region of interest does not match the surfel color data for the one or more surfels corresponding to the region of interest comprises:

determining that a distance between one or more pixel values of the image data for the region of interest and one or more pixel values associated with the surfel color data for the region of interest is larger than a threshold.

18. The method of claim 11, wherein determining that the image data for the region of interest does not match the surfel color data for the one or more surfels corresponding to the region of interest comprises:

identifying a particular region that is within the detectable region for the one of the one or more detection sensors;

determining a first distance between one or more pixel values of image data for the particular region and one or more pixel values associated with surfel color data for the particular region;

determining a second distance between one or more pixel values of the image data for the region of interest and one or more pixel values associated with the surfel color data for the region of interest; and determining that a difference between the first distance and the second distance is larger than a threshold.

19. A system comprising one or more computers and one or more storage devices storing instructions that are operable, when executed by the one or more computers, to cause the one or more computers to perform operations comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest does not match surfel color data for one or more surfels corresponding to the region of interest;

in response, designating the region of interest as having an unexpected object; and performing the vehicle planning process with the region of interest designated as having the unexpected object.

20. One or more non-transitory computer storage media encoded with computer program instructions that when executed by a plurality of computers cause the plurality of computers to perform operations comprising:

obtaining, for a particular location of a vehicle having one or more cameras and one or more detection sensors, surfel data comprising a plurality of surfels, wherein each surfel in the surfel data has a respective location and corresponds to a different respective detected surface in an environment;

obtaining image data captured by a camera of the one or more cameras;

determining that a region of interest for detecting objects for a vehicle planning process is outside a detectable region for one of the one or more detection sensors;

in response, determining that the image data for the region of interest does not match surfel color data for one or more surfels corresponding to the region of interest;

in response, designating the region of interest as having an unexpected object; and performing the vehicle planning process with the region of interest designated as having the unexpected object.

* * * * *